C. H. ONERHEIM.
CONDIMENT HOLDER.
APPLICATION FILED JAN. 19, 1918.
1,292,959.
Patented Jan. 28, 1919.
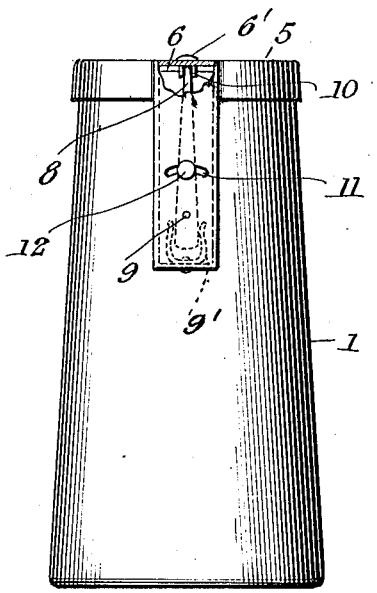
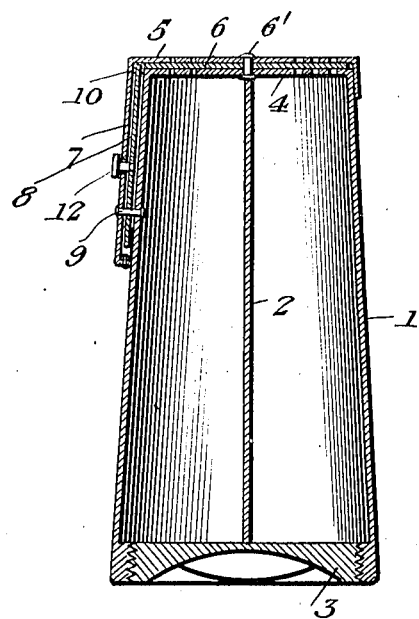
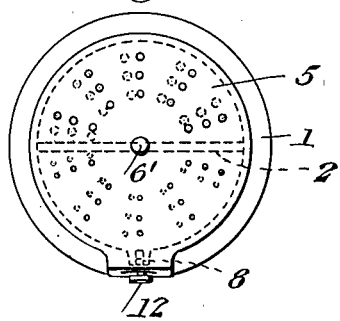
Inventor
C. H. Onerheim
By Victor J. Evans
Attorney

UNITED STATES PATENT OFFICE.

CHRISTOPHER H. ONERHEIM, OF BEND, OREGON.

CONDIMENT-HOLDER.

1,292,959.　　　　　Specification of Letters Patent.　　Patented Jan. 28, 1919.

Application filed January 19, 1918.　Serial No. 212,701.

*To all whom it may concern:*

Be it known that I, CHRISTOPHER H. ONERHEIM, a subject of the King of Norway, residing at Bend, in the county of Crook and State of Oregon, have invented new and useful Improvements in Condiment-Holders, of which the following is a specification.

This invention relates to new and useful improvements in condiment holders, and the principal object of the invention is to provide a device of this nature which is divided into two compartments adapted to contain salt and pepper.

Another object of the invention is to provide improved means for opening and closing the device for controlling the passage of the salt and pepper therefrom.

Another object of the invention is to provide a device of this character which is simple and durable in construction, reliable and efficient in operation and one which can be manufactured and placed upon the market at a minimum cost.

The invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views and in which:—

Figure 1 is an elevation of the invention.

Fig. 2 is a longitudinal section taken centrally of the device.

Fig. 3 is a top view thereof.

As shown in these views the receptacle 1 is provided with a central partition 2 which provides two compartments in the receptacle. The lower end of the receptacle is closed by a screw cover 3 which abuts against the bottom of the partition as shown. The top of the receptacle is closed by a perforated plate 4. 5 indicates a top plate also perforated and 6 indicates a central plate provided with perforations and movably arranged between said plates 4 and 5. 6' indicates a stud passing through the centers of said plates and engaging the partition 2. A recess 7 is formed in one side of the receptacle in which is located a finger 8 which is pivoted at 9 to the wall of the receptacle. The upper end of this finger is pointed and engages a projection 10 on the center plate 6 so that when the finger is moved the center plate will be oscillated to cause the perforations therein to register with the perforations in the other plates. 11 indicates a slot through which a button 12 projects, said button being connected with the finger whereby said finger may be rocked. The finger is normally held in position with the cover closed by means of a spring clip 9'.

The compartments are filled with pepper and salt or the like by removing the bottom 3. Then by operating the finger the center plate 6 may be oscillated to bring the perforations therein in register with the perforations in the other plates so that the pepper and salt may be shaken from the receptacle. If desired I may so form the perforations that when the perforations on one side are in register the others are out of register so that only one of the condiments may be delivered at a time.

It is thought from the foregoing description that the advantages and novel features of my invention will be readily apparent.

I desire it to be understood that I may make slight changes in the construction and in the combination and arrangement of the several parts, provided that such changes fall within the scope of the appended claim.

What I claim is:—

A device of the class described comprising a receptacle having a pair of compartments therein and a recess in its side adjacent the top, a perforated top for said receptacle, a movable perforated plate located on said top, a spring controlled finger pivoted in the recess and engaging with said plate and a finger engaging part on said finger projecting from the recess for oscillating said plate.

In testimony whereof I affix my signature.

CHRISTOPHER H. ONERHEIM.